(12) United States Patent
Sugiyama et al.

(10) Patent No.: US 8,098,672 B2
(45) Date of Patent: Jan. 17, 2012

(54) INTERNET TELEPHONE SYSTEM ENSURING COMMUNICATION QUALITY AND PATH SETTING METHOD

(75) Inventors: Kazuhiko Sugiyama, Tokyo (JP); Kei Akiyoshi, Fukuoka (JP)

(73) Assignee: Juniper Networks, Inc., Sunnyvale, CA (US)

( * ) Notice: Subject to any disclaimer, the term of this patent is extended or adjusted under 35 U.S.C. 154(b) by 1053 days.

(21) Appl. No.: 11/966,191

(22) Filed: Dec. 28, 2007

(65) Prior Publication Data
US 2008/0101583 A1 May 1, 2008

Related U.S. Application Data

(63) Continuation of application No. 09/816,705, filed on Mar. 23, 2001, now Pat. No. 7,336,603.

(30) Foreign Application Priority Data

Mar. 24, 2000 (JP) ................................. 2000-084895

(51) Int. Cl.
*H04L 12/28* (2006.01)
(52) U.S. Cl. ........ 370/401; 370/230; 370/352; 370/356; 370/393; 370/395
(58) Field of Classification Search .......... 370/352–356, 370/392, 395, 387, 389, 468, 401, 92, 493
See application file for complete search history.

(56) References Cited

U.S. PATENT DOCUMENTS

| 6,336,129 B1 | 1/2002 | Ise et al. ........................ 709/201 |
| 6,490,274 B1 | 12/2002 | Kim |
| 6,507,577 B1 | 1/2003 | Mauger et al. ................. 370/356 |
| 6,522,627 B1 | 2/2003 | Mauger .......................... 370/230 |
| 6,529,499 B1 | 3/2003 | Doshi et al. ................... 370/352 |
| 6,600,735 B1 | 7/2003 | Iwama et al. ................. 370/352 |
| 6,674,744 B1 | 1/2004 | Doshi et al. ................... 370/352 |
| 6,973,033 B1 | 12/2005 | Chiu et al. ................. 370/230.1 |

FOREIGN PATENT DOCUMENTS

CN 1222018 A 7/1999

OTHER PUBLICATIONS

"RFC 760—DoD standard Internet Protocol", Information Sciences Institute, University of Southern California, Marina del Rey, California, Jan. 1980, http://www.faqs.org/rfcs/rfc760.html, 32 pages.
"RFC 1889—RTP: A Transport Protocol for Real-Time Applications", H. Shulzrinne et al., Jan. 1996, http://www.faqs.org/rfcs/rfc1889.html, 60 pages.
"RFC 2705—Media Gateway Control Protocol (MGCP) Version 1.0", M. Arango et al., Oct. 1999, http://www.faqs.org/rfcs/rfc2705.html, 102 pages.
"RFC 2676—QoS Routing Mechanisms and OSPF Extensions", G. Apostolopoulos et al., Aug. 1999, http://www.ietf.org/rfcs/rfc2676.txt, 47 pages.
"Multiprotocol Label Switching Architecture", E. Rosen et al., Aug. 1999, http://tools.ietf.org/wg/mpls/draft-ietft-mpls-arch/draft-ietf-mpls-arch-06.txt, 52 pages.

(Continued)

*Primary Examiner* — Joe Cheng
*Assistant Examiner* — Khaled Kassim
(74) *Attorney, Agent, or Firm* — Harrity & Harrity, LLP

(57) ABSTRACT

A method of setting a path in a network using an Internet protocol includes determining whether a first label switching path having an adequate band for transferring a packet between two label switching routers exists. The method also includes setting a new label switching path when it is determined that the first label switching path does not exist.

18 Claims, 7 Drawing Sheets

OTHER PUBLICATIONS

"RFC 2205-Resource ReSerVation Protocol (RSVP)—Version 1 Functional Specification", R. Braden, Ed. et al., Sep. 1997, http://www.faqs.org/rfcs/rfc2205.html, 79 pages.

"RFC 2475—An Architecture for Differentiated Service" S. Blake et al., Dec. 1998, http://www.faqs.org/rfcs/rfc2475.html, 29 pages.

The People's Republic of China Office Action dated Jan. 10, 2003 (English Translation of the same).

INTERNET TELEPHONE SYSTEM ENSURING COMMUNICATION QUALITY AND PATH SETTING METHOD

This application is a continuation of U.S. patent application Ser. No. 09/816,705 filed Mar. 23, 2001, now U.S. Pat. No. 7,336,603, the disclosure of which is hereby incorporated herein by reference.

BACKGROUND OF THE INVENTION

1. Field of the Invention

The present invention relates to a voice data communication system (i.e., Internet telephone system) using an Internet protocol (IP) network, and more particularly, to an Internet telephone system capable of ensuring the quality of voice data communication (communication quality or QoS (Quality of Service)) and a path setting method.

2. Description of the Related Art

In recent years, there have been experiments to implement interactive communication through a telephone by using a network adopting an Internet protocol (in particular, Internet), and an ITU-T recommendation on a VoIP (Voice over Internet Protocol) has been issued. Also, RFCs (Request for Comments) have also been issued from an IETF (Internet Engineering Task Force). For example, the IP, voice converting method (RTP), communication system (MGCP: Media Gateway Control Protocol) are described in the IETF RFC760, IETF RFC1889, and IETF RFC2705, respectively.

However, the IP allows the delay in transfer of a packet and the disposition of the packet which are caused by congestion and, therefore, the IP is not suitable to real-time interactive communication. The ITU-T recommendation prescribes a method for solving a problem of the conversion between a telephone number and an IP address and a method for converting (mapping) voice data into an IP packet and, however, it prescribes no method for ensuring communication quality. The IETF proposes only a schematic standard for Internet telephone system.

Accordingly, predetermined communication quality must be ensured by preventing the disposition of a voice packet on the IP network and by reducing the delay in transfer of the packet to realize the Internet telephone system to satisfy user's desire.

SUMMARY OF THE INVENTION

Accordingly, it is one object of the present invention to provide an Internet telephone system to which communication quality is ensured.

It is also another object of the present invention to provide an Internet telephone system capable of real-time communication without the delay in transfer.

It is further another object of the present invention to provide a path setting method capable of reducing the load of a router when a path is set on an IP network.

Other objects of the present invention will be understood apparently in the following description.

According to a first aspect of the present invention, an Internet telephone system implements voice communication between a telephone subscribing to a first voice network and a telephone subscribing to a second voice network via a network using an Internet protocol. The internet telephone system constitutes the network, and includes a plurality of label switch routers each of which uses a label switching technique. A first media gateway is connected across a first specific label switch router among the plurality of label switch routers and a first signaling transfer point connected to the first voice network, and assembles/resolves a VoIP packet. A second media gateway is connected across a second specific label switch router among the plurality of label switch routers and a second signaling transfer point connected to the second voice network, and assembles/resolves a VoIP packet. A path control unit checks whether or not there is a path having a residual band larger than a band necessary for transferring the VoIP packet between the first specific label switch router and the second specific label switch router. When it is determined that there is not the path, the path control unit sets a new path having a band that is equal to or more than a double band of the necessary band. A packet control unit is connected to the path control unit, and instructs the first media gateway and the second media gateway to transfer the VoIP packet via the path that is checked or set by the path control unit.

According to a second aspect of the present invention, in a path setting method, in order to execute voice communication between a telephone subscribing to a first voice network and a telephone subscribing to a second voice network, a path to which a band is ensured is set on a network using an Internet protocol connected between the first voice network and the second voice network. A path control unit determines whether or not there is a path having a residual band larger than a band necessary for transferring a VoIP packet between two edge label switch routers. Also, the path control unit sets a new path having band that is equal to or more than a double band of the necessary band between the two edge label switches by the path control unit, when it is determined that there is not the path.

According to a third aspect of the present invention, a call control apparatus sets a path to which a band is ensured on a network using an Internet protocol connected between a first voice network and a second voice network to execute voice communication between a telephone subscribing to the first voice network and a telephone subscribing to the second voice network. The call control apparatus includes a path control unit which determines whether or not there is a path having a residual band larger than a band necessary for transferring a VoIP packet between two edge label switch routers. When it is determined that there is not the path, the call control apparatus sets a new path having a band that is equal to or more than a double band of the necessary band between the two edge label switch routers. A packet control unit controls a media gateway connected to the two edge label switch routers to transfer the VoIP packet via a path having the residual band or the new-set path.

According to a fourth aspect of the present invention, a router is used for a network using an Internet protocol connected between a first voice network and a second voice network to implement voice communication between a telephone subscribing to the first voice network and a telephone subscribing to the second voice network. The router sets a path having a band that is equal to or more than a double band of a band necessary for transferring a VoIP packet under the control of a call control apparatus, thereby establishing a plurality of connections in the path.

According to a fifth aspect of the present invention, a computer program product for implementing a call control apparatus sets a path to which a band is ensured on a network using an Internet protocol connected between a first voice network and a second voice network to execute voice communication between a telephone subscribing to the first voice network and a telephone subscribing to second voice network. The computer program product includes the steps of determining whether or not there is a path having a residual band larger than a band necessary for transferring a VoIP packet between two edge label switch routers and, when it is determined that there is not the path, setting a new path having a band that is equal to or more than a double band of the necessary band between two edge label switch routers, and controlling a media gateway connected to the two edge label switch routers to transfer the VoIP packet via the path having the residual band larger than the necessary band or the new-set path.

DESCRIPTION OF THE PREFERRED EMBODIMENTS

First, the conventional Internet telephone system will be described in order to apparently understand the present invention.

Currently, three types of Internet telephone system are known. In a first Internet telephone system, voice communication is performed between personal computers in which an Internet telephone program is installed via the Internet. In a second Internet telephone system, a device, so-called gateway is located between a normal telephone and the Internet, thereby realizing voice communication via the Internet between the telephones. A third Internet telephone system is constituted by combining the first Internet telephone system and second Internet telephone system, thereby enabling the voice communication even between the normal telephone and the personal computer.

Figure 1:
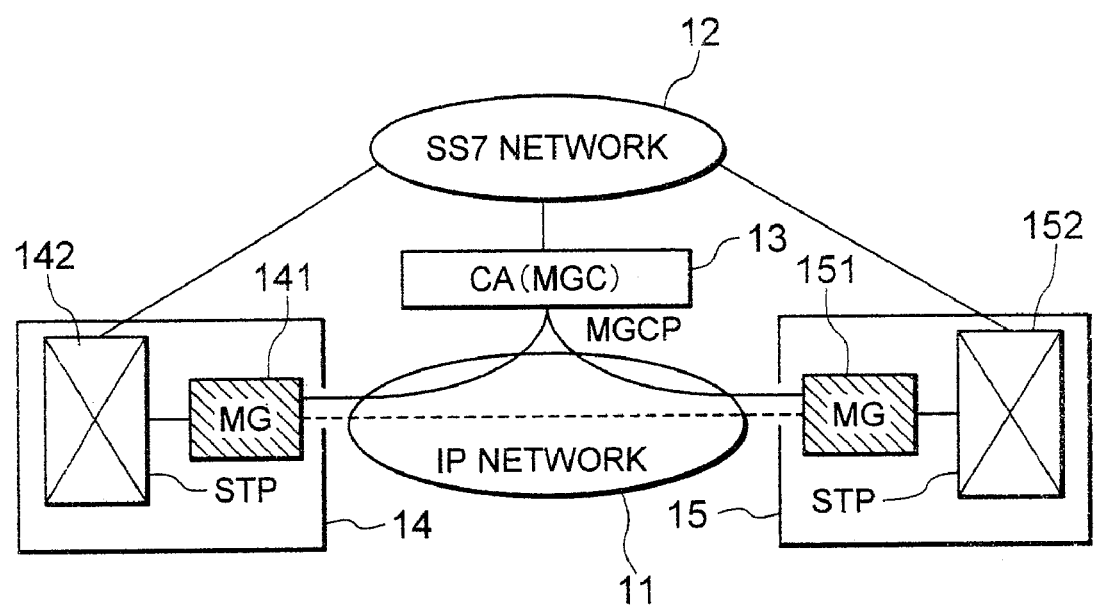
FIG. 1 is a block diagram showing the structure of a conventional Internet telephone system using an IP network.

Herein, a description is given of the second Internet telephone system capable of using the normal telephone with reference to FIG. 1. This Internet telephone system uses an Media Gateway Control Protocol (MGCP).

As shown in FIG. 1, this Internet telephone system comprises a call agent (CA) 13 which is connected to an IP network (e.g., Internet) 11 and a No. 7 signal-system network (e.g., public telephone network) 12. The call agent 13 is also called a Media Gateway Controller (MGC). Gateways 14 and 15 comprise media gateways (MG) 141 and 151 connected to the IP network 11 and call agent 13 and signaling transfer points (STP) 142 and 152 connected to the No. 7 signal-system network 12, respectively.

Figure 2:
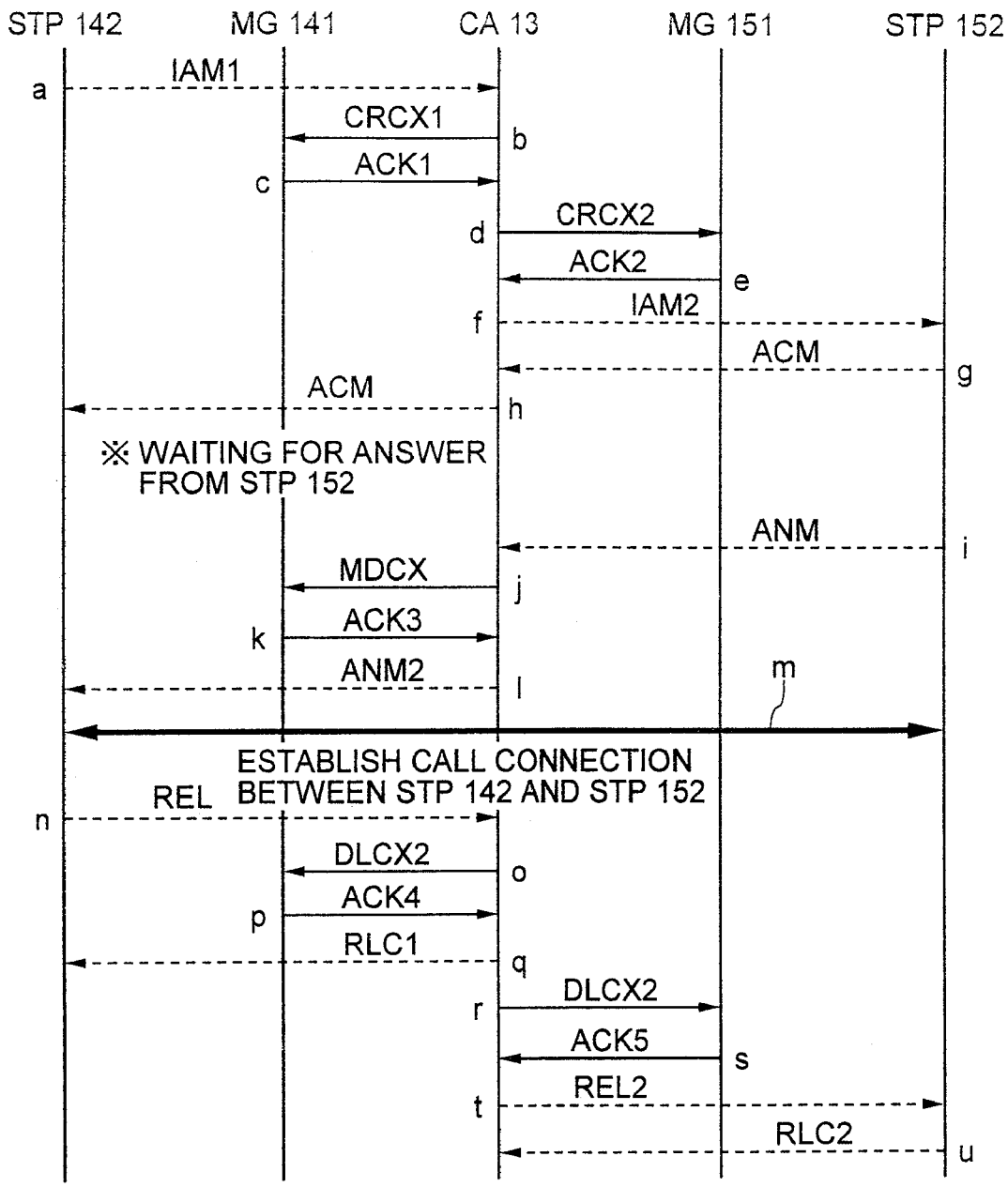
FIG. 2 is a diagram showing a sequence for implementing communication in the Internet telephone system in FIG. 1.

The operation of the second Internet telephone system will be described with reference to FIGS. 1 and 2. Herein, assume that a sender telephone (or an originator: not shown) is connected to the gateway 14, and an addressed telephone (or a destination: not shown) is connected to the gateway 15. Information indicating the relationship thereof is stored in a memory of the call agent 13.

First of all, the sender telephone calls the gateway 14 and notifies a telephone number of the addressed telephone. When the call from the sender telephone is received, the signaling transfer point 142 of the gateway 14 transmits a connection request signal IAM (Initial Address Message) 1 including end point information to the call agent 13 via the No. 7 signal-system network 12 (sequence a). The end point information includes an IP address of the gateway 14 and a telephone number of the addressed telephone.

When the connection request signal IAM1 is received from the signaling transfer point 142, the call agent 13 specifies the gateway 15 associated with the addressed telephone on the basis of the end point information in the received connection request signal. Then, the call agent 13 transmits a connection generating request signal CRCX1 to the media gateway 141 via the IP network 11 to establish the connection to the specified gateway 15 (sequence b).

When the connection generating request signal CRCX1 is received, the media gateway 141 executes a connection establishing process to the gateway 15 and also transmits an answer signal ACK1 for notifying the end of the connection establishing process to the call agent 13 via the IP network 11 (sequence c). This answer signal ACK1 includes session description such as a protocol version.

When the answer signal ACK1 is received from the media gateway 141, the call agent 13 transmits a connection establishing request signal CRCX2 to the media gateway 151 (sequence d). When a predetermined connection establishing process ends, the media gateway 151 transmits an answer signal ACK2 including the session description to the call agent 13 (sequence e).

As mentioned above, in the IP network 11, a one-way path is established from the media gateway 141 to the media gateway 151.

Next, the call agent 13 transmits a connection request signal IAM2 to the signaling transfer point 152 via the No. 7 signal-system network 12 (sequence f). The signaling transfer point 152 calls the addressed telephone corresponding to the telephone number included in the connection request signal IAM2 from the call agent 13. Simultaneously, the signaling transfer point 152 transmits an answer signal ACM (Address Complete Message) to the call agent 13 to notify the start of call of the addressed telephone (sequence g).

When the answer signal ACM is received from the signaling transfer point 152, the call agent 13 transfers it to the signaling transfer point 142 (sequence h). This results in entering a state of calling the addressed telephone from the sender telephone.

When the addressed telephone answers the call, the signaling transfer point 152 transmits an answer signal ANM1 (Answer Message) to the call agent 13 (sequence i). When the answer signal ANM1 is received, the call agent 13 transmits a connection adjusting request signal MDCX including the session description to the media gateway 141 to change connection between the media gateways 141 and 151 to be interactive (sequence j).

The media gateway 141 changes the state of connection based on the session description included in the connection adjusting request signal MDCX. The media gateway 141 transmits an answer signal ACK3 to the call agent 13 after changing the state of connection (sequence k).

Thereafter, the call agent 13 confirms that the interactive connection is established between the media gateways 141 and 151, and transmits the answer signal ANM2 to the signaling transfer point 142 (sequence 1).

As mentioned above, this Internet telephone system enables the voice communication via the IP network between the sender telephone and addressed telephone (sequence m).

When an on-hook signal from the addressed telephone is detected, the signaling transfer point 142 transmits a communication line connection end signal RELL (Release Message) to the call agent 13 (sequence n).

When the communication line connection end signal RELL is received, the call agent 13 transmits a connection release request signal DLCX2 to the media gateway 141 (sequence o). When the connection release request signal DCLX2 is received, the media gateway 141 performs a connection releasing process and also transmits an answer signal ACK4 including a connection parameter to the call agent 13 (sequence p). When the release of connection is confirmed by the reception of the answer signal ACK4 from the media gateway 141, the call agent 13 transmits a communication line release complete signal RLC1 (Release Complete Message) to the signaling transfer point 142 (sequence q). Thereby, the signaling transfer point 142 checks the release of connection.

Next, the call agent 13 transmits the connection release request signal DLCX2 to the media gateway 151 (sequence r). Similarly to the media gateway 141, after connection releasing process, the media gateway 151 also transmits an answer signal ACK5 including a connection parameter to the call agent 13 (sequence s). When the release of connection is confirmed by the reception of the answer signal ACK5 from the media gateway 151, the call agent 13 transmits a communication line connection end signal REL2 to the signaling transfer point 152 (sequence t). When the release of connection is confirmed by the reception of the communication line connection end signal REL2, the signaling transfer point 152 transmits the communication line release complete signal RLC2 to the call agent 13 (sequence u).

The above-mentioned processes result in releasing the connection between the message gateways 141 and 151.

As will be apparently understood in the above description, an MGCP is used for controlling the VoIP gateways 14 and 15 from the outside. That is, the MGCP defines an interface between the call agent 13 and the media gateways 141 and 151. By using the MGCP, the call agent 13 can control the media gateways 141 and 151 and also can notify the call agent 13 of an event from the media gateways 141 and 151.

A description is given of an Internet telephone system according to a first embodiment of the present invention with reference to FIGS. 3 to 7.

Figure 3:
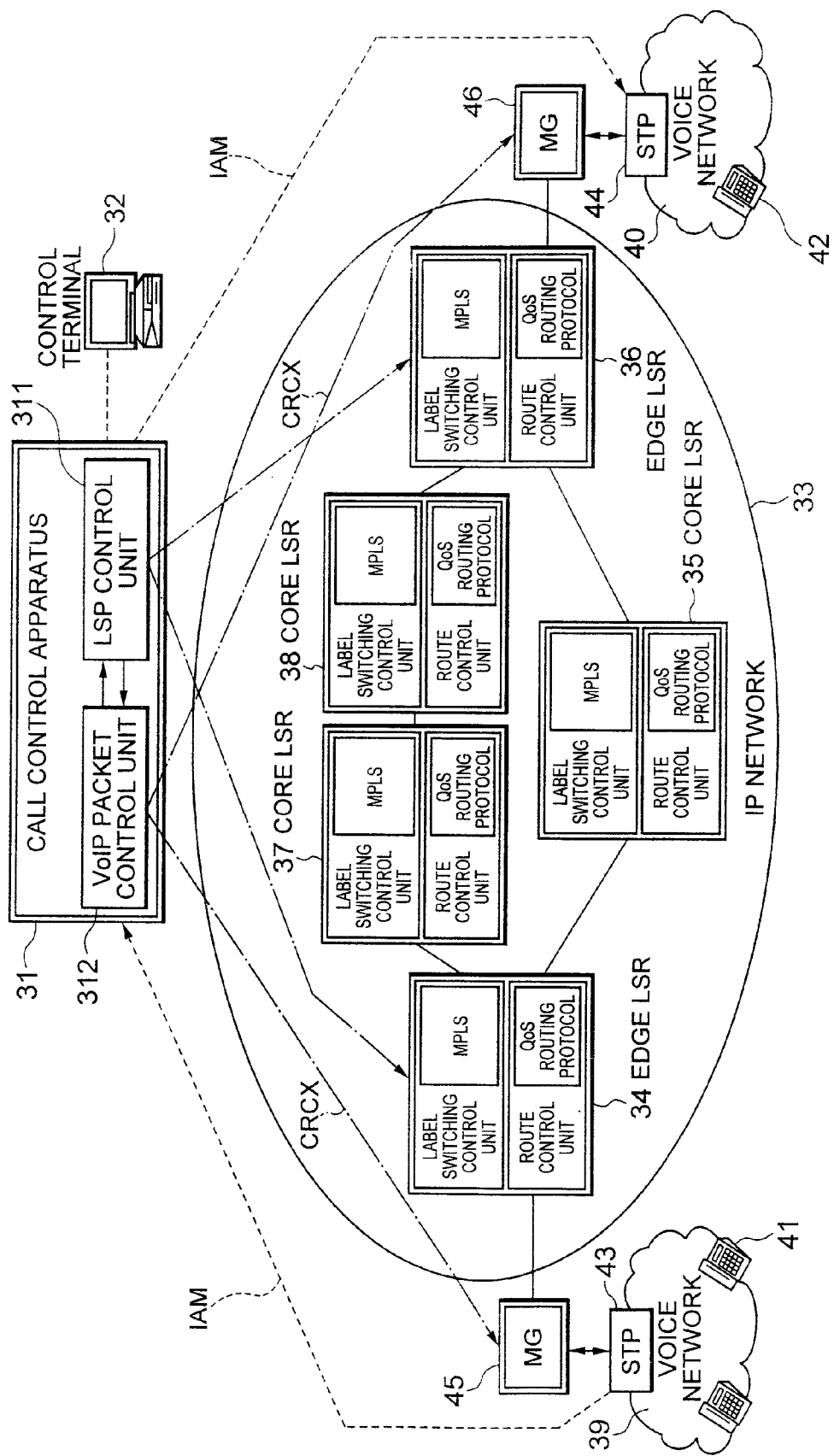
FIG. 3 is a diagram showing the structure of an Internet telephone system according to a first embodiment of the present invention.

As shown in FIG. 3, this Internet telephone system has a call agent (CA) or call control apparatus 31. A control terminal 32 is connected to the call agent 31. An Internet protocol (IP) network 33 includes a plurality of label switch routers (LSR) 34, 35, 36, 37, and 38. A plurality of voice networks 39 and 40 includes at least telephones (or voice terminals) 41 and 42, respectively. The voice networks 39 and 40 are directly connected to the signaling transfer points 43 and 44, respectively. The signaling transfer points 43 and 44 are connected to a public telephone network and are directly connected to media gateways (MG) 45 and 46, respectively. The media gateways 45 and 46 are directly connected to label switch routers 34 and 36, respectively.

The call agent 31 has an LSP control unit 311 and a VoIP packet control unit 312. The call agent 31 controls a call of the IP network and, for example, is arranged in an exchange station of the public telephone network. The LSP control unit 311 stores a maximum band settable between adjacent label switch routers in an internal memory (not shown). The LSP control unit 311 stores the connection relationship between the signaling transfer points 43 and 44 and the media gateways 45 and 46 in the internal memory. The LSP control unit 311 stores the connection relationship between the telephones included in the voice networks 39 and 40 and the media gateways 45 and 46 in an internal memory (telephone number table) with correlation to telephone numbers of the telephones. Further, the LSP control unit 311 stores the connection relationship between the media gateways 45 and 46 and the label switch routers 34 and 36 in the internal memory. Information indicative of the connection relationships is supplied, for example, through a control terminal 32 by a maintenance person.

When connection request signals (off-hook signal and dial signal) are received from the signaling transfer points 43 and 44, the LSP control unit 311 searches the internal memory and specifies the media gateway 45 or 46 connected to the signal transfer point 43 or 44 and the label switch router 34 or 36 connected thereto. The specified media gateway and label switch router are called a sender media gateway and a sender edge label switch router, respectively. The LSP control unit 311 searches the telephone number table, and specifies the media gateway 45 or 46 connected to the voice network 39 or 40 including the telephone corresponding to the addressed telephone number included in the connection request signal and the label switch router 34 or 36 connected thereto, respectively. The specified media gateway and label switch router are called an addressed media gateway and the addressed edge label switch router, respectively. The label switch routers 35, 37, and 38 located between the sender edge label switch router and the addressed edge label switch router are called core label switch routers. The LSP control unit 311 notifies the VoIP packet control unit 312 of addresses (IP addresses) assigned to the sender and addressed edge media gateways 45 and 46.

The LSP control unit 311 manages a label switching path (LSP) on the IP network. For example, the LSP control unit 311 controls the sender and addressed edge label switch routers 34 and 36 and confirms the label switching path which exists therebetween. The LSP control unit 311 provides a new label switching path between the sender and addressed label switch routers 34 and 36 if the necessity may arise. Each of the label switching paths to be set on the IP network has a wide band capable of accommodating a plurality of connections (e.g., approximately 100 to 1000 connections are preset). In other words, the label switching path has a band which is equal to or more than a plurality of times of a band necessary for transferring the VoIP packet. One label switching path can accommodate a plurality of connections and, therefore, the LSP control unit 311 needs no setting of label switching path each time a connection is established. As a consequence, the load of the overall IP network is reduced.

The label switching path may be provided in advance between any desired two label switch routers in the LSP control unit 311, irrespective of the connection request signal. In this case, if no congestion is caused, the label switching path needs no control or no adjustment between the label switch routers. As mentioned above, because each label switching path can accommodate a large number of connections, e.g., 100 to 1000 connections. The label switching path to be preset may be provided across three or more label switch routers. The band of the label switching path may be changed in accordance with day of the week or time.

The VoIP packet control unit 312 notifies the addressed media gateway of a service port number assigned to the sender media gateway. The VoIP packet control unit 312 notifies the sender media gateway of a service port number assigned to the addressed media gateway. Further, the VoIP packet control unit 312 notifies the sender media gateway and addressed media gateway of a fact that the connection between the sender media gateway and the addressed media gateway is established.

Figure 4:
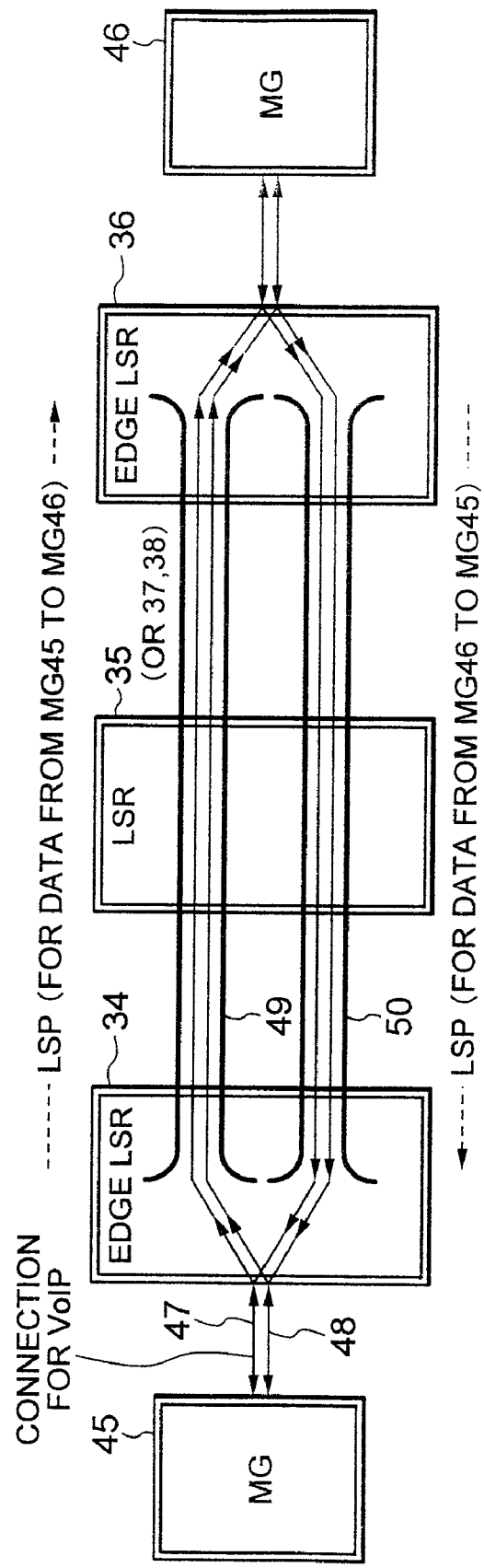
FIG. 4 is a diagram for explaining the relationship between a label switching path and the connection in the Internet telephone system in FIG. 3.

FIG. 4 shows the relationship between the label switching path and VoIP connection. As shown in FIG. 4, when the VoIP connections 47 and 48 are established between the media gateways 45 and 46, label switching paths 49 and 50 are sequentially established between the edge label switch routers 34 and 36. The label switching paths 49 and 50 are established similarly to, for example, the sequences shown in FIG. 2. In each label switching path, one or a plurality of VoIP connections 47 and 48 are sequentially formed in the one-way direction, respectively. Incidentally, in the label switching paths 49 and 50, the edge label switch routers 34 and 35 are connected for the purpose of the convenience of description. Actually, a label switching path is established between two adjacent routers. Therefore, a new label switching path may be established between the edge label switch routers 34 and 35, and an existing label switching path may be used between the core label switch router 35 and edge label switch router 36.

Referring back to FIG. 3, the sender media gateway and addressed media gateway answer the notification from the VoIP packet control unit 312, and establishes a connection through the label switching path between the sender label switch router and the addressed label switch router. The sender and addressed media gateways convert analog/digital data and assemble/resolve a packet (or VoIP data) between the voice networks 39 and 40 and the IP network 33.

Each label switch router has a route control unit (QoS routing protocol) and a label switching control unit (MPLS). When the route control unit calculates a route, information on communication quality is considered. In the IETF draft-querin-qos-routing-ospf-05.txt, the aforementioned route control unit is described. The label switching control unit uses an MPLS (Multi-Protocol Label Switching) technique to realize the assurance of band. In the IETF Draft-ietf-mpls arch-06.txt, the MPLS is described.

A band reservation system (RSVP: ReSerVation Protocol) and a service differentiating system (Diff-Serv: Differentiated Service) are known as techniques for ensuring the communication quality. The former technique is described in the IETF RFC2205, and the latter technique is described in the IETF RFC2475. However, the RSVP periodically optimizes a communication route and, therefore, the load is applied to the IP network. The Diff-Serv throws out the packet when the congestion is caused. Then, this Internet telephone system reduces the load of the IP network, and uses the MPLS so as to ensure the communication quality.

The sender edge label switch router calculates the shortest route to the addressed edge label switch router under the control operation of the LSP control unit 311. In this case, as the shortest route, a route is selected to ensure the band equal to "band requested by information on the communication quality×predetermined number" (=band of label switching path). If there has already been label switching path in the calculated shortest route, the sender edge label switch router determines whether or not a connection can be established. In other words, the sender edge router determines whether or not a band necessary for transferring the VoIP packet remains in the existing label switching path. If the connection can be established, the sender edge label switch router does not establish a new label switching path. If there is not a label switching path on the shortest route and if there is no residual band for establishing the connection in existing the label switching path, the sender edge label switch router establishes a new label switching path on the shortest route.

The addressed edge label switch router operates in the same manner as that of the sender edge label switch router, and establishes the label switching path to obtain the shortest route to the sender edge label switch router if the necessity may arise.

Each label switch router located on the label switching path transfers the VoIP data as if it flowed on the label switching path by using information which is called a label. Similarly to a CSR (Cell Switch Router) used for an asynchronous transfer mode (ATM) network, the label switch router can transfer the IP packet (i.e., fast transfer), without performing the IP process.

Figure 5:
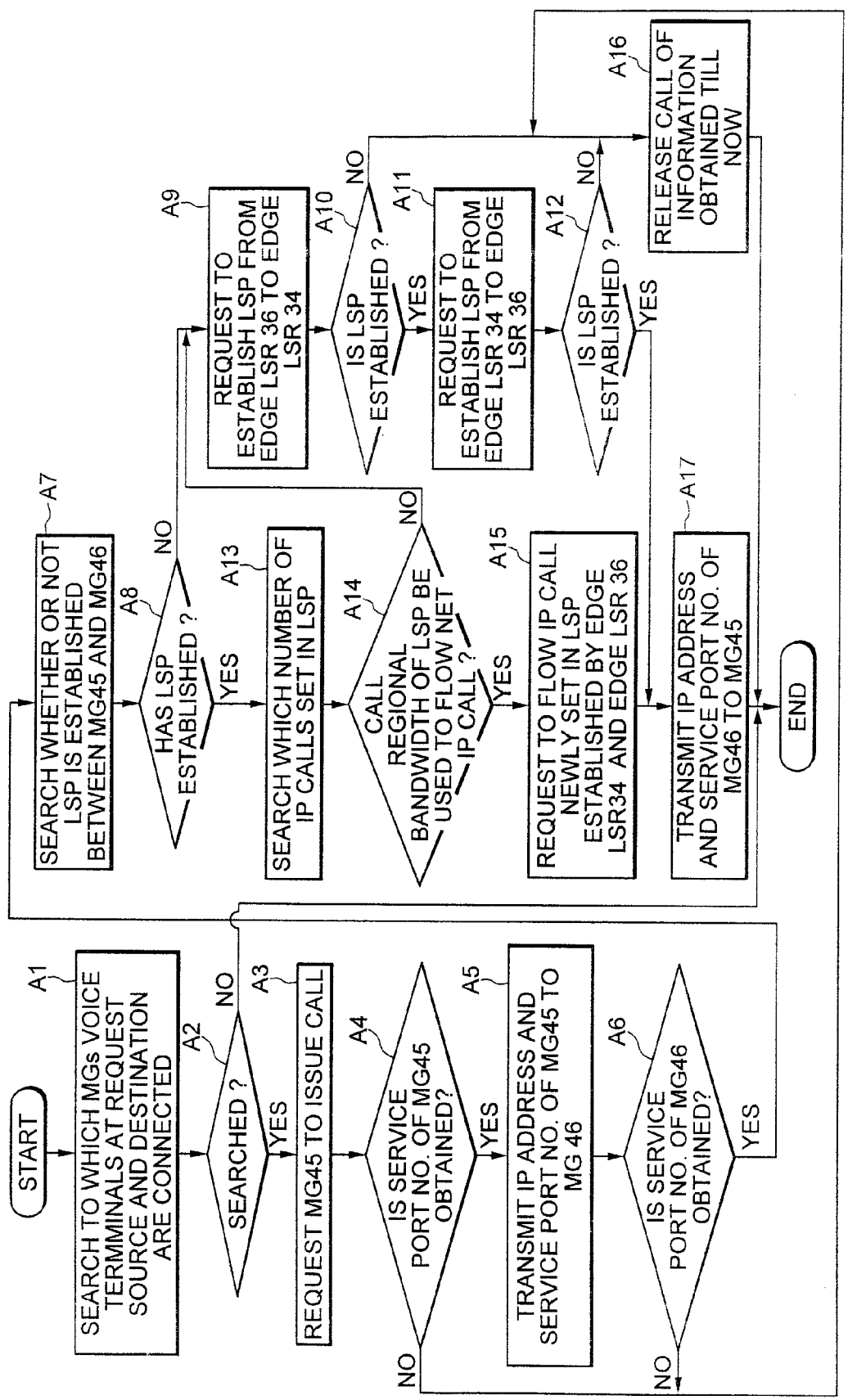
FIG. 5 is a flowchart for explaining the operation of a label switching control unit of a label switch router shown in FIG. 3.

A description is given of the operation of an Internet telephone system in FIG. 3 hereinlater with reference to FIG. 5. Herein, assume that the telephone 41 is a sender telephone and the telephone 42 is an addressed telephone.

To start with, the sender telephone 41 calls the call agent 31 and notifies the call agent 31 of the telephone number of the addressed telephone 42. This notification is transmitted to the LSP control unit 311 of the call agent 31 as the connection request signal IAM by the signaling transfer point 43 connected to the network 39 including the sender telephone 41. The connection request signal IAM includes a telephone number of the sender telephone 41, telephone number of the addressed telephone 42, and information that the transmission (and band assurance) of the VoIP packet is desired.

When the connection request signal IAM is received, the LSP control unit 311 specifies the sender signaling transfer point 43 which transmits the connection request signal IAM. The LSP control unit 311 searches the internal memory, and specifies the sender media gateway 45 connected to the sender signaling transfer point 43 and the sender edge label switch router 34 connected to the sender media gateway 45. Also, the LSP control unit 311 specifies the addressed signaling transfer point 44 connected to the voice network 40 including the addressed telephone 42, the addressed media gateway 46 connected to the addressed signaling transfer point 44, and the addressed edge label switch router 36 connected to the addressed media gateway 46, based on the addressed telephone number (step A1).

The LSP control unit 311 determines whether or not the sender media gateway 45 and addressed media gateway 46 are specified in step A1 (step A2). If at least one of the sender media gateway 45 and addressed media gateway 46 is not specified, the LSP control unit 311 cancels processes after that. If both the sender media gateway 45 and addressed media gateway 46 are specified, IP addresses of the specified sender media gateway 45 and addressed media gateway 46 are notified to the VoIP packet control unit 312.

When the notification of the IP address is received from the LSP control unit 311, the VoIP packet control unit 312 requests to issue a call to the sender media gateway 45 (step A3). When the request to issue a call is received from the VoIP packet control unit 312, the sender media gateway 45 notifies the VoIP packet control unit 312 of a service port number of the sender media gateway 45.

When the notification of the service port number of the sender media gateway 45 is received from the sender media gateway 45, the VoIP packet control unit 312 notifies the addressed media gateway 46 of the IP address and service port number of the sender media gateway 45 and requests to issue a call (steps A4 and A5). When the notification of the service port number of the sender media gateway 45 is not received from the sender media gateway 45, the VoIP packet control unit 312 performs a cancel process in step A16 and cancels processes after that.

The addressed media gateway 46 notifies the VoIP packet control unit 312 of the service port number of the addressed media gateway 46 in accordance with the request to issue a call from the VoIP packet control unit 312. When the notification of the service port number is not received from the addressed media gateway 46, the VoIP packet control unit 312 performs a cancel process in step A16 and cancels processes after that (step A6).

Next, the LSP control unit 311 checks whether or not the label switching path has already been established between the edge label switch routers 34 and 36 (step A7). If the label switching path has not been established yet between the edge label switch routers 34 and 36, the LSP control unit 311 requests the addressed edge label switch router 36 to establish the label switching path to the sender edge label switch router 34 (steps A8 and A9).

The addressed edge switching router 36 tries to establish the label switching path to the sender edge label switch router 34 and notifies the LSP control unit 311 of the result (step A10). If the addressed edge label switch router 36 establishes the label switching path to the sender edge label switch router 34, the LSP control unit 311 requests the sender edge label switch router 34 to establish the label switching path to the addressed edge label switch router 36 (step A11). If the addressed edge label switch router 36 does not establish the label switching path to the sender edge label switch router 34, the LSP control unit 311 performs a cancel process in step A16 and cancels processes after that.

The sender edge label switch router 34 tries to establish the label switching path to the addressed edge label switch router 36 and notifies the LSP control unit 311 of the result (step A12). If the sender edge label switch router 34 does not establish the label switching path to the addressed edge label switch router 36, the LSP control unit 311 performs the cancel process in step A16 and cancels processes after that.

If the sender edge label switch router 34 establishes the label switching path to the addressed edge label switch router 36, the LSP control unit 311 notifies the VoIP packet control unit 312 of such a fact. The VoIP packet control unit 312 controls the media gateway 46 and transmits an incoming call address and the IP address of the sender telephone to the addressed telephone 42. When it is detected that the addressed telephone 42 is hooked off, the media gateway 46 notifies the VoIP packet control unit 312 of such a fact. Thereafter, the VoIP control unit 312 notifies the sender media gateway 45 of the IP address and service port number of the addressed media gateway 46 and requests to change the connection of call (step A17).

Thereafter, the voice communication via the IP network becomes possible between the sender telephone 41 and addressed telephone 42. That is, the media gateway 45 converts a voice signal from the telephone 41 into the VoIP packet, adds a header including the IP address and service port number of the media gateway 46, and transmits the VoIP packet added with the header to the media gateway 46. Also, the media gateway 46 converts a voice signal from the telephone 42 into the VoIP packet, adds a header including the IP address and service port number of the media gateway 45, and transmits the VoIP packet added with the header to the media gateway 45. When the VoIP packet to be addressed to the telephone 41 is received, the media gateway 45 converts the received VoIP packet into a voice signal and transmits it to the telephone 41. Also, when the VoIP packet to be addressed to the telephone 42 is received, the media gateway 46 converts the received VoIP packet into a voice signal and transmits it to the telephone 42.

On the other hand, if the LSP control unit 311 detects that there has already been a label switching path between the edge label switch routers 34 and 36 in step A8, the LSP control unit 311 checks whether or not a new connection can be established in the detected label switching path (step A13). That is, the LSP control unit 311 checks whether or not there is an unused band necessary for the voice communication and whether or not the band necessary for the voice communication can be ensured in the detected label switching path.

When the LSP control unit 311 determines that a new connection cannot be established in the detected label switching path, the processing routine advances to step A9 from step A14. When the LSP control unit 311 determines that a new connection can be established in the detected label switching path, the LSP control unit 311 requests the edge label switch routers 34 and 36 to establish a new connection in the detected label switching path. In other words, the LSP control unit 311 requests the edge label switch routers 34 and 36 to flow the VoIP data packet between the edge label switch routers 34 and 36 via the detected label switching path (step A15).

After that, as mentioned above, the voice communication via the IP network is possible between the sender telephone 41 and the addressed telephone 42.

Figure 6:
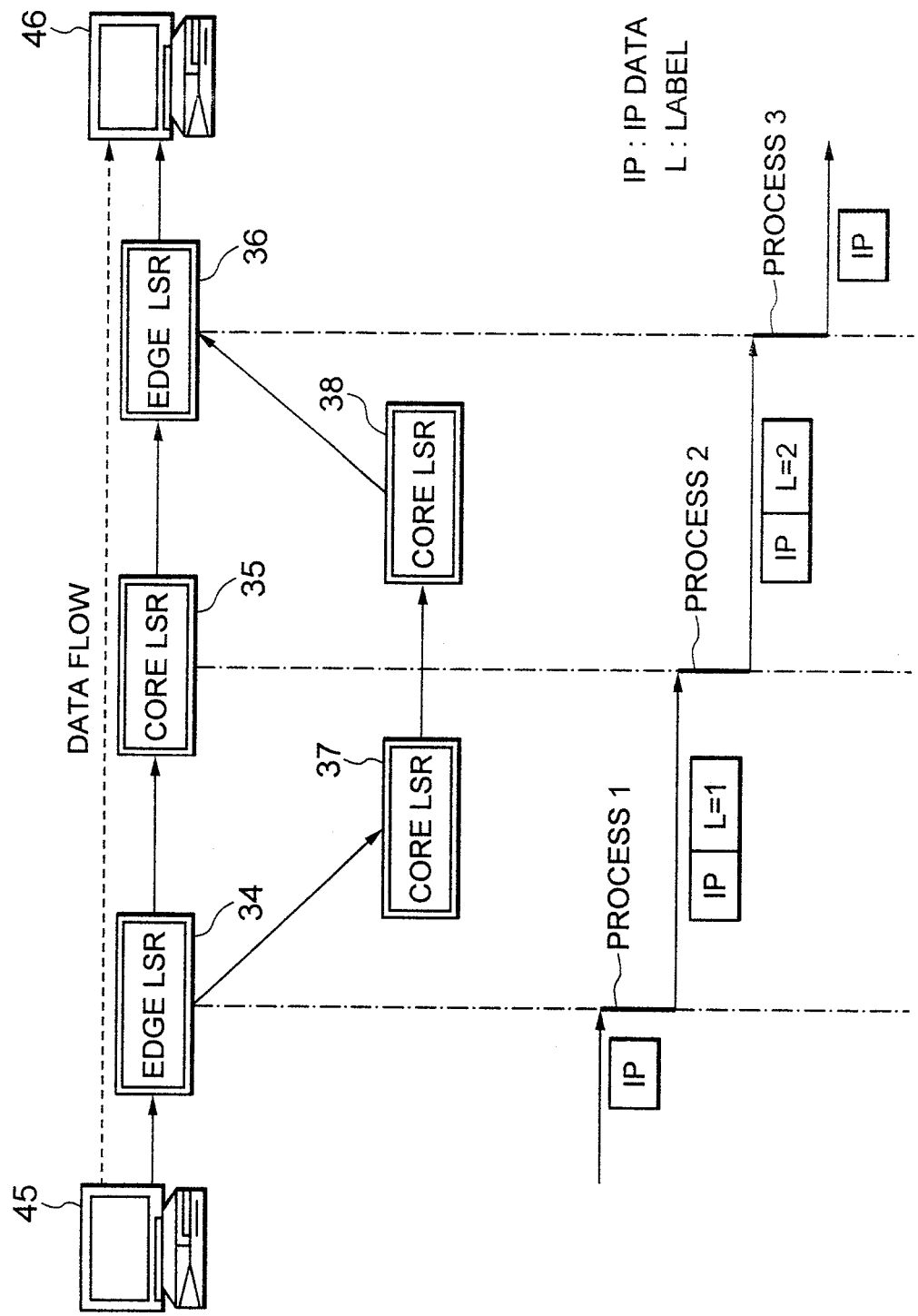
FIG. 6 is a diagram showing the operation of the Internet telephone system in FIG. 3.

Next, referring to FIG. 6, a description is given of the operation of the label switching control unit MPLS of each label switch router.

The edge label switch router 34 adds a label to the IP data packet to be transmitted from the media gateway 45. Value of the label depends on a route through which the IP packet passes (label switching path). If all of the IP packets are transmitted to the media gateway 46 via the same label switching path, the same label (such as L=1) is added to the all of the IP packets (process 1).

The core label switch router 35 transfers the IP packet which is transmitted by the edge label switch router 34 in accordance with the label which is added to the transmitted to IP packet (input label). In this case, the core label switch router 35 exchanges the input signal to another label signal (output label). Because the core label switch router 35 stores the relationship between the input label and the transfer destination (and output label) in the internal memory, the IP packet can be transferred at a high speed on the basis of only the input label without referring to the header of the IP packet. Only if the label which is added to the received IP packet is not stored in the internal memory, the core label switch router 35 recognizes the transfer destination by referring to the header of the IP packet. Also, the core label switch router 35 assigns a new output label and stores the relationship between the input label and the output label. Herein, the input label (L=1) is added to the all of the IP packets and, therefore, the output label (L=2) is added in place of the input label, thereby transferring the IP packet with the added output label to the edge label switch router 36 (process 2).

If the label which is added to the received IP packet indicates the transfer to the media gateway 46, the edge label switch router 36 removes the label from the IP packet and transfers only the IP packet to the media gateway 46 (process 3).

The transfer of packet to the media gateway 45 from the media gateway 46 is executed in the manner similar to the foregoing.

In this Internet telephone system, the band of connection which has been established once is ensured, and the delay in transfer of the packet is decreased by using the label switch router. Further, in the Internet telephone system, the setting of the path is not necessary every connection because the band of label switching path is set to be large. Accordingly, the number of negotiation between the routers is decreased and the setting of path is possible in a short time in the Internet telephone system.

Note that the program in which the above-mentioned operation is described is supplied to an electric computer, thereby realizing the call agent, MPLS server, and label switch router.

Figure 7:
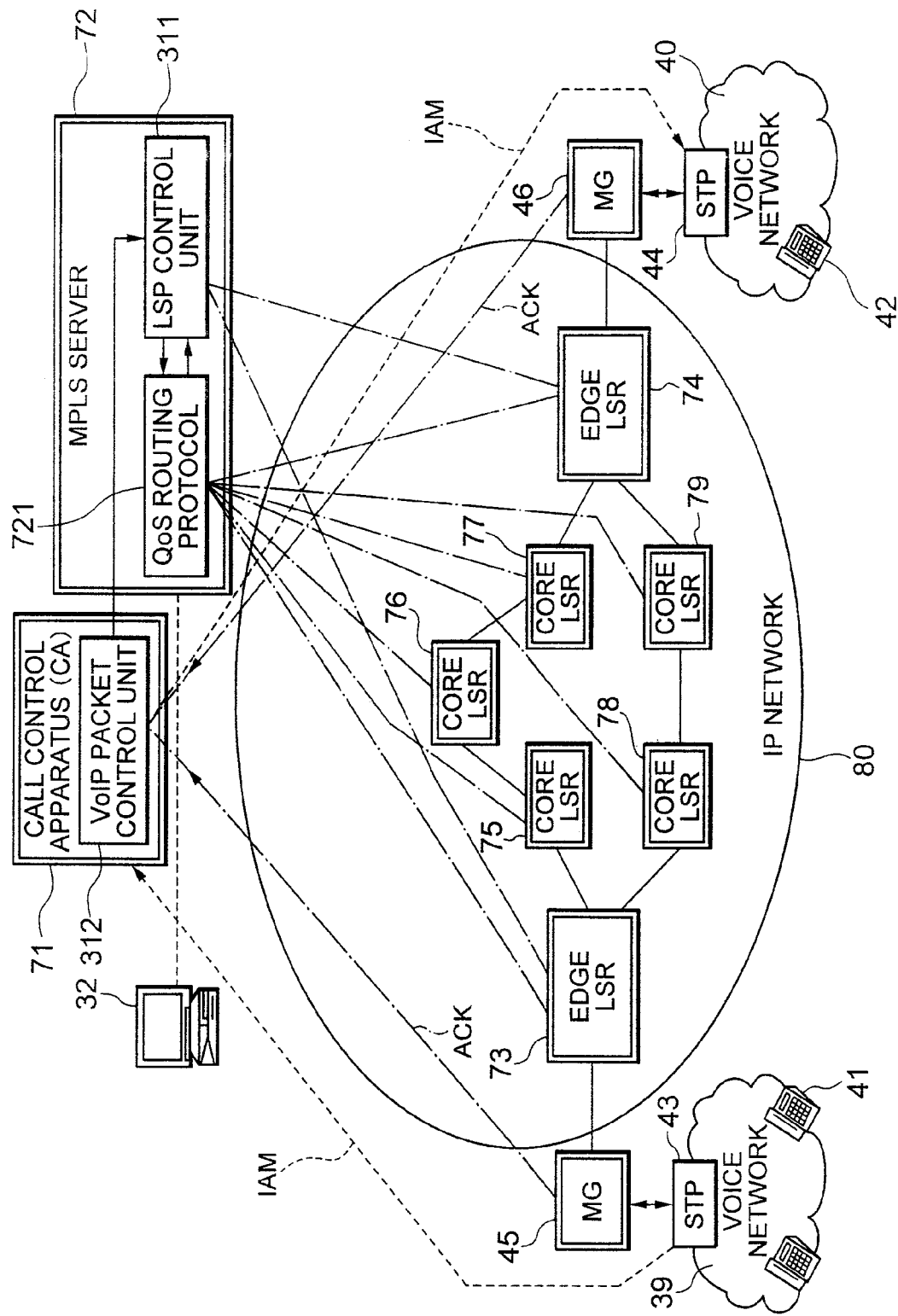
FIG. 7 is a diagram showing the construction of an Internet telephone system according to a second embodiment of the present invention.

Next, a description is given of an Internet telephone system according to a second embodiment of the present invention with reference to FIG. 7. Points-different from those of the first embodiment will be mainly described hereinbelow.

Referring to FIG. 7, the Internet telephone system comprises a call agent (CA) or call control apparatus 71, an MPLS server 72 of the label switching system (MPL), an IP network 80 including a plurality of label switch routers (LSR) 73-79, and media gateways 45 and 46. The label switch routers 73 and 74 are called edge label switch routers while the label switch routers 75-79 are called core label switch routers.

The media gateway 45 is directly connected to the label switch router 73, and the media gateway 46 is directly connected to the label switch router 74.

The call agent 71 has a VoIP packet control unit 312, and manages a connection between the media gateways 45 and 46. If the assurance of band is necessary when the connection is established between the media gateways 45 and 46, the call agent 71 requests the LSP control unit 311 of the MPLS server 72 to form the label switching path between the edge label switch router 73 and 74.

The MPLS server comprises the LSP control unit 311 and a route control unit (QoS routing protocol) 721. The LSP control unit 311 answers the inquiry of an address from the VoIP packet control unit 312, and establishes and manages the label switching path. The route control unit 721 performs routing together with the edge label switch routers 73 and 74 and core label switch routers 75 to 79. The LSP control unit 311 sets the route when the route control unit 721 operates.

The route control unit 721 is connected to all of the label switch routers 73-79, and collectively manages the label used on the IP network. Consequently, each label switch router needs no management of the label. That is, the negotiation between the routers becomes unnecessary. Since the route control unit 721 manages the labels in a lump, it is possible to transfer the packets from the sender edge label switch router to the addressed edge label switch router by using a single label. In other words, the exchange of label is unnecessary in each label switch router and, therefore, the packet can be transferred at a higher speed.

In this Internet telephone system, the label switching path is established in the same manner as that of the Internet telephone system according to the first embodiment. Thereafter, similarly to the case of the Internet telephone system according to the first embodiment, the voice communication is possible between the sender telephone and the addressed telephone in this Internet telephone system. In this case, each label switch router refers to label information which is stored in the route control unit 721, and executes the transfer of the VoIP packet.

Although the embodiments of the present invention are described in the foregoing, the present invention is not limited to the above embodiments and can variously be modified without departing the range of the spirit. For example, it is possible to use a personal computer in which an Internet telephone program is installed, instead of the telephone. It is also possible to use a telephone having an automatic answering function such as an answering telephone. In this case, the telephone having an automatic answering function executes operations such as recording, reproducing, and transfer of a voice signal. The IP network is not limited to the Internet, and a LAN and WAN using an Internet protocol may be employed.

What is claimed is:

1. An Internet telephone system for voice communication between a telephone associated with a first voice network and a telephone associated with a second voice network via a network using an Internet protocol (IP), the Internet telephone system comprising:
a plurality of label switch routers configured to forward data using label switching;
a first media gateway coupled to a first one of the plurality of label switch routers and to a first signaling transfer point, the first signaling transfer point being coupled to the first voice network;
a second media gateway coupled to a second one of the plurality of label switch routers and to a second signaling transfer point, the second signaling transfer point being coupled to the second voice network;
a path control unit configured to:
store information identifying connection relationships associated with telephones in the first and second voice networks, the information including telephone numbers of telephones in the first and second voice networks,
store information identifying connection relationships associated with the plurality of label switch routers and the first and second media gateways,
determine whether a first path, having a first band larger than a band necessary for transferring a voice over Internet protocol (VoIP) packet between said first label switch router and said second label switch router, exists and,
when the first path does not exist, set a new path for transferring the VoIP packet; and
a packet control unit, coupled to the path control unit, configured to:
instruct the first media gateway and the second media gateway to transfer said VoIP packet via the first path or the new path.

2. The Internet telephone system of claim 1, wherein the new path has a band that is equal to or more than a hundred times that of the necessary band.

3. The Internet telephone system of claim 1, further comprising:
a route control unit coupled to each of the plurality of label switch routers and configured to:
manage use of labels on the IP network.

4. The Internet telephone system of claim 1, wherein each label switch router includes a route control unit.

5. The Internet telephone system of claim 3, wherein said route control unit is further configured to:
manage transfer of the VoIP packet from the first label switch router to the second label switch router via a number of other ones of the plurality of label switch routers using a single label.

6. A path setting method of setting a path for use on a network using an Internet protocol connected between a first voice network and a second voice network to couple a first telephone associated with the first voice network and a second telephone associated with the second voice network, the path setting method comprising:

storing information identifying connection relationships associated with the first and second telephones, the information including telephone numbers of the first and second telephones;

storing information identifying connection relationships associated with a plurality of label switch routers included in the network and first and second media gateways;

determining whether a first label switching path, having a residual band larger than a first band necessary for transferring a voice over Internet protocol (VoIP) packet between two edge label switch routers of the plurality of label switch routers, exists; and setting a new label switching path when the first label switching path does not exist.

7. The path setting method of claim 6, wherein said new path has a band that is equal to or more than a hundred times of said first band.

8. A call control apparatus for setting a path on a network using an Internet protocol coupled to a first voice network and a second voice network to execute voice communication between a telephone associated with the first voice network and a telephone associated with the second voice network, the call control apparatus comprising:

a path control unit configured to:
store information identifying connection relationships associated with telephones in the first and second voice networks, the information including telephone numbers of the telephones in the first and second voice networks, store information identifying connection relationships associated with a plurality of label switch routers and first and second media gateways;

determine whether a first path, having a residual band larger than a band necessary for transferring a voice over Internet protocol (VoIP) packet between a first one of the plurality of label switch routers and a second one of the plurality of label switch routers, exists, and when the first path does not exist, set a new path having a band that is equal to or more than two times the necessary band; and a packet control unit configured to:
store a maximum band settable between adjacent ones of the plurality of label switch routers, and control a media gateway coupled to the first label switch router to transfer the VoIP packet via the first path or the new path.

9. The call control apparatus of claim 8, wherein the new path has a band of at least a hundred times that of the necessary band.

10. A non-transitory computer-readable medium comprising instructions executable by a processor, the computer-readable medium comprising:

one or more instructions for storing information identifying connection relationships among telephones in a first voice network and a second voice network, the information including telephone numbers of the telephones in the first voice network and the second voice network;

one or more instructions for storing a maximum band settable between adjacent ones of a plurality of label switch routers;

one or more instructions for determining whether a first path, for transferring a voice over Internet protocol (VoIP) packet between two of the plurality of label switch routers, exists;

one or more instructions for setting, when the first path does not exist, a new path; and one or more instructions for controlling a media gateway, coupled to at least a first one of the two label switch routers, to transfer the VoIP packet via the first path or the new path.

11. The computer-readable medium of claim 10, further comprising:

one or more instructions for managing use of labels associated with transferring the VoIP packet via a centralized controller.

12. A device, comprising:

at least one controller configured to:
store information identifying connection relationships among telephones in a first voice network and a second voice network, the information including telephone numbers of telephones in the first voice network and the second voice network, receive a request associated with establishing a voice connection between a first device and a second device via a network, the voice connection using voice over Internet protocol (VoIP), determine whether a first label switching path exists in the network between a first one of a plurality of label switch routers and a second one of the plurality of label switch routers, the first label switch router and the second label switch router being involved in routing VoIP packets between the first device and second device, and request, when the first label switching path does not exist, that the first label switch router establish a second label switching path to the second label switch router.

13. The device of claim 12, wherein the at least one controller is further configured to:

manage use of labels associated with label switching in the network such that transfer of a VoIP packet from the first label switch router to the second label switch router through at least one other label switch router uses a single label.

14. The device of claim 13, wherein each of the first and second label switch routers comprises an edge router in the network and the other label switch router comprises a core router in the network.

15. A method, comprising:
storing information identifying connection relationships associated with telephones in a first voice network and a second voice network;

storing information identifying connection relationships associated with a first media gateway, coupled to the first voice network, and second media gateway, coupled to the second voice network, and a plurality of label switching routers included in an Internet protocol (IP) network;

determining whether a first label switching path, having a band larger than a first band for transferring a voice over Internet protocol (VoIP) packet between a first one of the plurality of label switching routers and a second one of the plurality of label switching routers, exists; and setting a new label switching path when the first label switching path does not exist.

16. The method of claim 15, further comprising:
managing use of labels associated with label switching in the IP network such that transfer of the VoIP packet from the first label switching router to the second label switching router through at least one other label switching router uses a single label.

17. The method of claim 15, further comprising:
managing, at a centralized control device, the use of labels associated with label switching in the IP network.

18. The method of claim 17, further comprising:
transferring the VoIP packet from the first label switching router to the second label switching router without the first label switching router or the second label switching router performing management with respect to a label.

* * * * *